(12) United States Patent
Bohinc, Jr.

(10) Patent No.: US 8,010,461 B2
(45) Date of Patent: Aug. 30, 2011

(54) METHOD OF DETECTION OF RADIOACTIVE MATERIAL

(75) Inventor: Jerry Bohinc, Jr., Gates Mills, OH (US)

(73) Assignee: Quintell of Ohio, LLC, Beachwood, OH (US)

( * ) Notice: Subject to any disclaimer, the term of this patent is extended or adjusted under 35 U.S.C. 154(b) by 923 days.

(21) Appl. No.: 11/958,539

(22) Filed: Dec. 18, 2007

(65) Prior Publication Data

US 2009/0321649 A1 Dec. 31, 2009

Related U.S. Application Data

(60) Provisional application No. 60/870,554, filed on Dec. 18, 2006.

(51) Int. Cl.
*G06Q 99/00* (2006.01)
*G06Q 30/00* (2006.01)
*G06Q 50/00* (2006.01)

(52) U.S. Cl. .......... 705/325; 705/332; 705/316

(58) Field of Classification Search ........ 705/26, 705/26.61, 27, 316, 325, 332; 340/539.26
See application file for complete search history.

(56) References Cited

U.S. PATENT DOCUMENTS

| | | | |
|---|---|---|---|
| 4,319,229 A | | 3/1982 | Kirkor |
| 4,646,978 A | * | 3/1987 | Johnson et al. ........ 241/24.12 |
| 4,663,623 A | | 5/1987 | Lax et al. |
| 5,479,023 A | | 12/1995 | Bartle et al. |
| 5,485,154 A | | 1/1996 | Brooks et al. |
| 5,615,247 A | | 3/1997 | Mills |
| 5,650,928 A | | 7/1997 | Hagenbuch |
| 5,828,220 A | | 10/1998 | Carney et al. |
| 5,939,982 A | | 8/1999 | Gagnon et al. |
| 5,982,838 A | | 11/1999 | Vourvopoulos |
| 6,031,454 A | | 2/2000 | Lovejoy et al. |
| 6,225,901 B1 | | 5/2001 | Kail, IV |
| 6,356,802 B1 | | 3/2002 | Takehara et al. |

(Continued)

FOREIGN PATENT DOCUMENTS

HU 72784 5/1996

(Continued)

OTHER PUBLICATIONS

Canberra website, <http://www.canberra.com/prodcuts/538.asp>, "ADM-606M Multi-Purpose Radiation Monitor" product description.

(Continued)

*Primary Examiner* — Jeffrey A Smith
*Assistant Examiner* — Brandy Zukanovich
(74) *Attorney, Agent, or Firm* — Panitch Schwarze Belisario & Nadel LLP

(57) ABSTRACT

A method is disclosed to determine an inspection protocol for radioactive material in shipping containers using an inspection technique threshold characteristic. The method includes weighing a container prior to shipment and determining a relative position of the container weight to at least one of a number of predetermined inspection technique threshold lines in an inspection threshold characteristic. Each of the of the predetermined inspection technique threshold lines corresponds to at least one of a number of inspection techniques. The container is classified as either a heavy container or a light container relative to at least one of the inspection techniques according to the relative position of the container weight to at least one of the predetermined inspection technique threshold lines. An inspection protocol for radioactive material in the container is selected according to the classification of the container.

8 Claims, 1 Drawing Sheet

Medium to heavy shielding will be detected by weight and/or x-ray

U.S. PATENT DOCUMENTS

| | | |
|---|---|---|
| 6,429,810 B1 | 8/2002 | De Roche |
| 6,624,760 B1 | 9/2003 | Kinzel et al. |
| 6,768,421 B1 | 7/2004 | Alioto et al. |
| 6,891,470 B2 | 5/2005 | Bohinc, Jr. |
| 6,919,803 B2 | 7/2005 | Breed |
| 6,937,692 B2 | 8/2005 | Johnson et al. |
| 7,026,944 B2 | 4/2006 | Alioto et al. |
| 7,030,755 B2 | 4/2006 | Bohinc, Jr. |
| 7,116,235 B2 | 10/2006 | Alioto et al. |
| 7,190,265 B1 | 3/2007 | Bohinc, Jr. |
| 7,220,967 B1 | 5/2007 | Shapiro et al. |
| 2003/0137968 A1 | 7/2003 | Lareau et al. |
| 2003/0149526 A1 | 8/2003 | Zhou et al. |
| 2004/0233055 A1* | 11/2004 | Canich et al. ............ 340/539.26 |
| 2005/0156734 A1 | 7/2005 | Zerwekh et al. |
| 2007/0023714 A1 | 2/2007 | Bohinc, Jr. |

FOREIGN PATENT DOCUMENTS

| | | |
|---|---|---|
| HU | 220207 | 11/2001 |
| JP | 540191 | 2/1993 |
| JP | 735868 | 2/1995 |
| JP | 2001311791 | 11/2001 |

OTHER PUBLICATIONS

Dye, D., "Sensors for Screening and Surveillance," <http://www-hoover.stanford.edu/research/conferences/nsf02/dye.pdf>, presented at the Hoover Institute National Security Forum, "Conference on Technology for preventing Terrorism," Mar. 2003.

Ortec website, <http://www.ortec-online.com/dtective.htm>, "Detective" product description, undated.

"Gamma Ray Gauging," IBM Technical Disclosure Bulletin, Mar. 1971, p. 2864.

Cuneo, E., Information Week website, <http://www.informationweek.com/story/Article.ihtml?articleID=8700375>, "Safe at Sea," Apr. 7, 2003.

It's China website, <http://china.tyfo.com/china/block/html/2003022600680.html>, "U.S. Ports velnerable to Attack—Intelligence," Aug. 13, 2003.

Lawrence Livermore National Laboratory Radiation Detection Center website <www.llnl.gov/llnl/06news/handouts/radiation_det_ctr.pdf>, "Technology Fact Sheet".

* cited by examiner

Medium to heavy shielding will be detected by weight and/or x-ray

Counter weighted container

METHOD OF DETECTION OF RADIOACTIVE MATERIAL

CROSS-REFERENCE TO RELATED APPLICATIONS

This application claims the benefit of U.S. Provisional Application No. 60/870,554, filed Dec. 18, 2006, entitled "Method of Detection of Radioactive Material."

BACKGROUND OF THE INVENTION

The difficulty implementing a strong and effective deterrence against a terrorist or rogue state's use of the commercial ocean cargo container as a delivery vehicle for a nuclear weapon continues to trouble the responsible experts. Especially worrisome is growth of nuclear capable states. Nuclear capable states under duress, acting alone or in cooperation with terrorists, conceivably could adopt a clandestine container delivery tactic, rather than a more easily monitored long range missile system. A container delivery vector is inexpensive, operationally simple, accurate and possibly untraceable.

Overview of Current Policy

Current Department of Homeland Security (DHS) defense architecture envisions layered but modest container deterrence as the best defense that it can muster today. The core of the plan is to approach near 100% container inspections in the U.S. arrival ports with advanced radiation portals. A portal is a drive-bye radiation sensor. Advanced means the portals will try to read the radiation spectrum that is essentially a fingerprint of the type of radioactive material that is the target of the inspection, hoping to cut down on the many false alarms that currently plague portal inspections. The General Accounting Office (GAO) questioned whether the new sensors do measurably reduce false alarms. However, the problems facing portal inspections are much deeper than false alarms; and are twofold: First, even an advanced sensor cannot detect a nuclear bomb if the nuclear device is shielded with only modest shielding. The DHS director has recently acknowledged this limitation in Congressional testimony. An adversary intent on executing a nuclear terrorist attack could easily shield its clandestine weapon and adopt a "detonate on detection" counter-strategy (discussed infra) as further protection. Every U.S. port is in a city and inspection after arrival in a U.S. port city is too late. This troubling fact is supported by efforts of the Department of Homeland Security which is working with the Department of Energy (DOE) and the U.S. Customs Service to try to push back the "inspection borders" out of the U.S. and into those of our trading partners. The reality that the U.S. is trying to export its problem to its trading partners is not lost on U.S. trading partners.

Detonation on Detection Dilemma

A few U.S. ports, aware of detonate on arrival or detection, are trying to intercept ships before entry into their ports. In Charleston, S.C., for example, a recent disaster exercise posited an intercepted container detonating during attempts to interdict after arrival in Charleston. The disaster planning event posited tens of thousands of casualties.

Problems with Foreign Inspection

Export of the inspection risk to foreign trading partners has also been fraught with problems and slow implementation. There are a number of acronym-titled programs (CPAT, CSI, etc) in process, but at the core is a reluctance of foreign governments to readily adopt an effective inspection process in their ports. The reasons are both obvious and subtle and range from high direct costs, slowing the flow of commerce, possible foreign legal liability for failure to detect, sovereignty issues of ancillary U.S. activity in a foreign country and U.S. uncertainty of system reliability in some countries that the U.S. would characterize as less friendly trading partners. After all, the actual inspection work and intelligence information comes from the foreign government and port operator security and not from U.S. personnel or agencies. In summary, foreign countries inspect only 10-20% of all of the port container traffic involving the U.S. and these countries do not wish to accept the inspection risk and delays that will impact on not just that 20% of container traffic but on all commerce. Thus the U.S. has a problem with a defense architecture based upon an inspection protocol that is scheduled to reach near 100% of all containers being inspected in the U.S. where it is too late to avoid "detonate upon detection" and using technical procedures that will not be able to detect realistic attacks. Meaningful attempts to export these inspections to foreign countries are probably unworkable as presently constructed. There is foreign information sharing and confidence building concepts like CSI and safe shipper programs that are useful but do not reach the core risk or the scope of the commercial issues either.

A long term solution from the Department of Homeland Security is to develop advanced density measuring x-ray systems that are very large versions of the baggage inspection equipment used in airports. Unfortunately, not only are these systems very expensive and as of yet technically un-proven, but they would be as large as car washes, be relatively slow in completed inspections and have to be located in foreign countries to solve the "detonate on detection" dilemma. This technology can be implemented only in the distant future and would be very uncertain in performance and scalability. It is desirable to have a method to detect contraband radioactive or nuclear material before suspect cargo reaches the U.S. because foreign ports cannot be widely enlisted for near 100% inspection levels overseas and because of the as-yet unsolved reliability of inspections of less friendly trading partners.

BRIEF SUMMARY OF THE INVENTION

A preferred embodiment of the present invention is a method to determine an inspection protocol for radioactive material in shipping containers using an inspection technique threshold characteristic. The method comprises weighing a container prior to shipment; determining a relative position of the container weight to at least one of a plurality of predetermined inspection technique threshold lines in an inspection threshold characteristic, each of the plurality of predetermined inspection technique threshold lines corresponding to at least one of a plurality of inspection techniques; classifying the container as one of a heavy container and a light container relative to at least one of the plurality of inspection techniques according to the relative position of the container weight to at least one of the plurality of predetermined inspection technique threshold lines and selecting an inspection protocol for radioactive material in the container according to the classification of the container.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The New Paradigm

There is an alternative paradigm to the current detection methods. Consider a curve representing the total of the all ocean containers graphed against container weight. Container weight is something that is known and carefully checked as the containers are used to safely balance and ballast the ship. Failure to do this properly can make a ship un-seaworthy, and therefore ballasting is not a minor issue.

Figure 1:
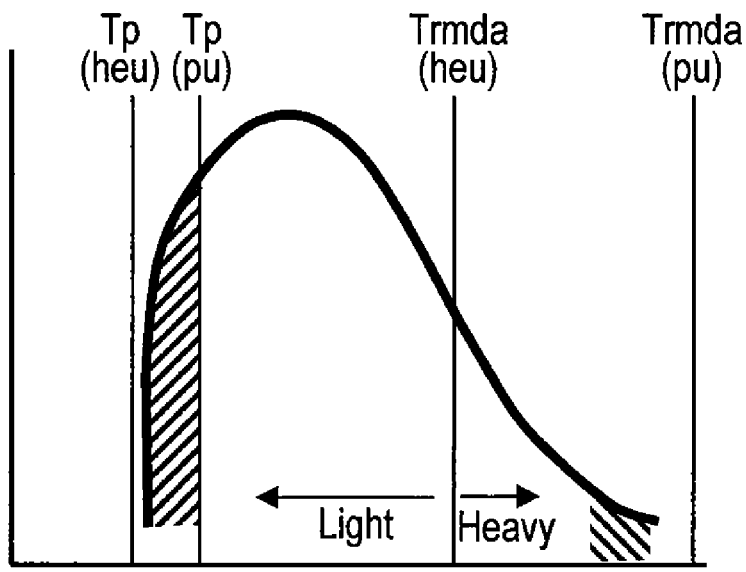
FIG. 1 is a graphical representation of the container weight and container quantity analysis characteristic used in accordance with preferred embodiments of the present invention.

Referring to FIG. 1, the curve mentioned above, called the Staudhammer, Bhattacharyya and Bohinc Curve (SBB Curve), is seen graphically. Container weight is on the x axis, and the number of containers on the y axis. The left most part of the curve represents empty containers being moved around the world and the right most tail of the curve represents the heaviest containers that can be transported on roads or rail, lifted by cranes, or safely contained in steel containers. The weight range is from about 4 tons to about 30 tons. The total number under the curve would be about 10 million, growing every year and represent the total number of containers entering the U.S.

The curve in FIG. 1 shows a number of vertical threshold lines. Each line represents the limit of performance for various kinds of inspection techniques for a fully shielded nuclear weapon. Often, it is desired to perform analysis for Highly Enriched Uranium (HEU). One can draw a line far to the left (Tportals(heu) or Tp(heu)) representing even the best portals for a fully shielded state HEU weapon. Plutonium weapons are easier to find and thus the T line would be slightly to the right (Tp(pu)). This T line means that containers that are heavier (to the right of the line) cannot assuredly be inspected, and containers to the left of the T line, cannot contain even a fully shielded weapon undetected. We call the containers to the left of the respective T lines, "light"; and the right of the respective T lines, "heavies" or "heavy".

As can be deduced from FIG. 1, if portal inspections are increased to 100% of containers, the only effective inspections and inspection protocols could be to the light containers to the left of the T line threshold. Since false alarms are a big problem for portals, note that the false alarm rate caused by natural or industrial radioactivity would not be limited to the light containers but to both the heavy and the light containers, in other words all of them.

Expected Performance

Applying the new paradigm, new thresholds are determined at Trmda(heu) and Trmda(pu) far to the right of the Tp thresholds. In fact, Trmda(pu) for plutonium for a fully a shielded plutonium weapon can always be detected regardless of weight or shielding. These new paradigm thresholds are determined in part with the underlying radioactive material detection apparatus (RMDA) (see U.S. Pat. No. 6,891,470 B2 the entire contents of which is hereby incorporated by reference) that uses the time of transit for sensing radioactivity rather than inspections in either the foreign or U.S. port. Thus the time of inspection is roughly 1 million seconds rather than 1, 2, or 5 seconds. Since the RMDA sensors are also spectrum capable, the results are about a $10^2$ to $10^5$ multiple improvement over conventional portals and exhibit fewer false alarms. Most importantly, the risk to the ports is reduced because risk determination is safely assessed at sea, not in a port and the impact on port activity is minimized as the sensors are ship centered and will not effect port commercial activity. Removal of the other unnecessary inspections might actually improve port performance because it is the heavy containers that need to be addressed in the loading ports. The light containers cannot contain an assembled weapon that would not be detected in transit. Thus foreign inspection requirements have been reduced and the quality of the inspections have been dramatically increased.

Figure 2A:
FIG. 2A is a representation of a medium to heavily shielded container subject to inspection in accordance with a preferred embodiment of the present invention.
Figure 2B:
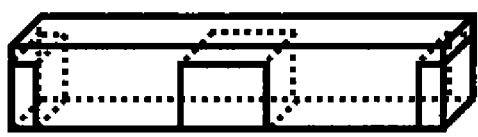
FIG. 2B is a representation of a counter-weighted container subject to inspection in accordance with a preferred embodiment of the present invention.

Close examination of the curve does reveal a potential number of containers to the right of the Trmda(heu) line; and these are potential problems that need to be addressed in a foreign port before arrival in the U.S. Fortunately, some techniques can be used to examine these containers. Since the new RMDA sensors are so much more effective than conventional sensors, any state or terrorist adversary would have to use full shielding around a concealed weapon, or risk RMDA detection. Necessary shielding, like the medium to heavy shielding shown in FIG. 2A, will weigh many tons and be readily viewed using even standard x-ray equipment now used in many countries to look for smuggling contraband as well as weapons. If just the heavy containers were simply x-rayed and subjected to later analysis, or preferably automatic pattern recognition, the tail container problem can be dealt with. The total number of containers is relatively small. Another possibility is to use a recently developed technique called inertia testing, done in a few seconds while the container is being weighed or loaded on the ship. Rotational inertia measurement (RIM) can readily sense concentrated shielding of the volume required to shield nuclear material effectively. If counter-weighting were used, an example of which is shown in FIG. 2B, the counter weights become an easily detected definitive identification for a weapon.

Inspection techniques and protocols now being used for containers become much more powerful if those techniques are focused on only the heavies. Safe shipper certification for only the very heaviest containers is much easier to implement. RIM or x-ray sampling of the only the heavy containers, together with RMDA, effectively makes a system that can be a near perfect deterrent against containers as weapon delivery systems.

Unassembled Special Nuclear Material

There is another problematic scenario which has not yet been discussed. So far, an embodiment of the present invention offers an improvement of many magnitudes of protection over the current paradigm of U.S. based portals that don't work well and that are used too late to have much value. This current strategy is overlaid with a partial foreign inspection regime that can never be fully implemented and which suffers from weak performance. The problematic concern is unassembled nuclear material, which includes a bomb disassembled that is to be reassembled in the U.S. after delivery to a U.S. safe house.

Fortunately, in the new paradigm, all the heavy containers, a manageable portion of the total number of containers, get inspected rigorously in foreign ports and the light containers can come to the U.S. without undue concern about detonate on detection. Advanced x-ray "car washes" can be built under quality control in the U.S. ports where a sampling inspection regime is made much easier because the heavier shielding needed to avoid detection from the superior RMDA concepts makes detection much easier. A heavy random sampling protocol on light containers and near 100% inspection on heavy containers overseas and the probability of detection of both assembled weapons and unassembled nuclear material will quickly reach a level that will provide a strong deterrence.

Because the RMDA is a ship centered inspection model there is very little impact on port activity, and therefore speed of implementation is limited only by the availability of massed produced sensors and a specific, detailed system design. The new paradigm system lends itself well to solving transshipment issues and implementation in smaller but critical risk ports; both are problems seeking a good solution.

Costs and Speed of Implementation

The RMDA is not inexpensive, but is a reasonable expense in consideration of the consequences. As stated earlier, a container can be a rogue state's alternative stealth missile. The U.S. is spending $10 billion each year to develop a missile defense system but arguably is not dealing with a much more likely attack mode at all. The Rand Corporation has estimated the consequences of a Los Angeles port nuclear event at $1 trillion dollars.

In a cost-benefit analysis, estimates of an attack (probability of an event each year) multiplied by the impact of the attack (consequences), in dollars, should equal the approximate expenditure for an effective protection. For example, a 1% likelihood every year times $1 trillion=10 billion every year. This is approximately the budget of a missile defense system, but with arguably higher probability of occurrence. The RMDA paradigm is estimated including operating and labor costs about $150 dollars per container trip. At present, a fully loaded government inspection programs today are crudely estimated at $40-80 dollars per container. If this amount was mainly redirected to the new RMDA paradigm the net cost might be only $100 dollars or so per containers. This amount would be not 1% but only 0.1% using the model we proposed in the previous paragraph.

In addition, cargo insurance per container trip is also about $100 dollars per $100,000 of container contents in value per trip. So, if an importer paid a special harbor fee of that amount, it would be only $1 dollar per $1000 of container value or 0.1% of value; a reasonable insurance cost since any weapon-of-mass-destruction (WMD) port event is certain to disrupt, and perhaps fatally damage, the international shipping industry. Therefore, importers, insurers, foreign shippers, foreign governments and U.S. government agencies should find the new RMDA inspection paradigm to be cost effective.

Summary

To implement the SBB curve paradigm, it is required to record the weight of the container and pass it to a control center. The decision and inspection process and protocols would flow from that data as a result of analysis under the SBB curve. If an inertia test can be performed at the weighing station and inertia tests can be performed in a few seconds, then that data can be passed on to the control center as well. In a preferred embodiment, the SBB curve analysis can be fully automated.

Using this data and historical experience containers can readily be divided into sets of heavies and lights in the manner described above. The inspection protocol is then designed for the appropriate risk and best location, loading port, destination port or during the transit period. In all cases, in transit monitoring makes shielding much more difficult which simplifies use of automatic x-ray analysis. A robust, practical, commerce friendly and reliable deterrent against terrorism and nuclear proliferation is possible.

A Preferred Embodiment

1. A single or multiple measured parameter(s) is sent wirelessly or via a wired connection to a system, in particular a control center having a database, as described in U.S. Pat. No. 6,891,470 B2 to determine the location and timing of active or passive inspection sensing and analysis of those results, as described in U.S. Pat. No. 6,965,314 B2. The entire contents of these previous patents are hereby incorporated by reference.

2. Single or multiple measured RMDA parameter(s) is transmitted via a wired connection or wirelessly to a central control center where together with inertia test data (see U.S. Pat. No. 6,891,470 B2, the entire contents thereof hereby incorporated by reference) the parameter(s) is used to determine the type and amount of further inspections techniques to be performed.

3. Single or multiple parameter(s) is used to measure the risk of detonation on arrival or detection by a wirelessly or by a wired connection transmission to a central control center.

4. A known single or multiple parameter(s) is transmitted to a central control center and is used to determine which cargo containers are subject to special shipping conditions or licenses 5. Determining the container weight. The container weight and the weight measurement analysis as discussed in the "Summary" paragraph above regarding the SBB curve determines the type and location of further inspection.

In another preferred embodiment, the mode of an interdiction at sea after detection of an unexplained radiation source during transit can be determined and may be best resolved by long quarantine practice with up to 30 days while all parties related to the container specific shipment are interviewed, and degradation of terrorist emergency detonation plans have occurred including secret diversion of the final destination including subtle reloading and at-sea interdiction if warranted. It is expected at-sea interdiction frequency which is a function of the inspection decision rubric were infrequent; the results would be consistent with the desired high deterrence levels and safe, cost-effective and improved flow of commerce.

In yet another preferred embodiment, at least one known or measured parameter and sensing data over variable or a pre-conditioned period of time is measured and allows for the selected application of an active inspection technique in which the data analyzed is at a later time, thus asynchronous with the transit of the container (see U.S. Pat. No. 6,965,314 B2, the entire contents thereof hereby incorporated by reference).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method to determine an inspection protocol for radioactive material in shipping containers using an inspection technique threshold characteristic, the method comprising:
 (a) receiving, at a control center having a database, a weight measurement of a container prior to shipment;
 (b) determining, at the control center, a relative position of the container weight to at least one of a plurality of predetermined inspection technique threshold lines in an inspection threshold characteristic, each of the plurality of predetermined inspection technique threshold lines corresponding to at least one of a plurality of inspection techniques;

(c) classifying, at the control center, the container as one of a heavy container and a light container relative to at least one of the plurality of inspection techniques according to the relative position of the container weight to at least one of the plurality of predetermined inspection technique threshold lines; and (d) selecting, at the control center, an inspection protocol for radioactive material in the container according to the classification of the container.

2. The method according to claim 1, wherein a relative position of the container weight to the left of one of the plurality of predetermined inspection technique threshold lines results in a classification of a light container relative to the inspection technique corresponding to the one of the plurality of predetermined inspection technique threshold lines.

3. The method according to claim 2, wherein an inspection protocol is selected that includes the radioactive material detection apparatus (RMDA) inspection technique during the transit of the container to the destination port.

4. The method according to claim 2, wherein an inspection protocol is selected that includes the radioactive material detection apparatus (RMDA) inspection technique during a quarantine period of the container in the port of origin.

5. The method according to claim 1, wherein a relative position of the container weight to the right of one of the plurality of predetermined inspection technique threshold lines results in a classification of a heavy container relative to the inspection technique corresponding to the one of the plurality of predetermined inspection technique threshold lines.

6. The method according to claim 5, wherein an inspection protocol is selected that includes a physical internal inspection technique of the container prior to shipment.

7. The method according to claim 1, wherein the inspection threshold characteristic is one in which container weight is compared to the total amount of containers destined for a particular port or ports.

8. The method according to claim 1, wherein at least one the plurality of predetermined inspection technique threshold lines are based on the radioactive material detection apparatus (RMDA) inspection technique.

* * * * *